US007460019B2

(12) United States Patent
Henderson

(10) Patent No.: US 7,460,019 B2
(45) Date of Patent: Dec. 2, 2008

(54) PERSONAL LOCATOR SYSTEM

(76) Inventor: Penny S. Henderson, 995 Sunview Dr., Mogadore, OH (US) 44260-9710

( * ) Notice: Subject to any disclaimer, the term of this patent is extended or adjusted under 35 U.S.C. 154(b) by 254 days.

(21) Appl. No.: 11/307,570

(22) Filed: Feb. 13, 2006

(65) Prior Publication Data

US 2007/0171045 A1 Jul. 26, 2007

Related U.S. Application Data

(60) Provisional application No. 60/596,172, filed on Sep. 6, 2005.

(51) Int. Cl.
*G08B 23/00* (2006.01)
*G08B 1/08* (2006.01)
*G01C 21/00* (2006.01)

(52) U.S. Cl. .............................. 340/573.1; 340/539.11; 340/539.13; 340/573.2; 340/573.3; 340/573.4; 342/357.01; 342/357.07; 701/213

(58) Field of Classification Search .............. 340/573.1, 340/539.11, 539.12, 539.13
See application file for complete search history.

(56) References Cited

U.S. PATENT DOCUMENTS 5,650,770 A 7/1997 Schlager et al.
5,712,619 A 1/1998 Simkin
5,742,233 A 4/1998 Hoffman et al.
5,754,136 A 5/1998 Kojima et al.
5,841,352 A 11/1998 Prakash
5,850,196 A 12/1998 Mowers
5,852,401 A * 12/1998 Kita ...................... 340/539.13
5,905,461 A 5/1999 Neher
5,963,130 A 10/1999 Schlager et al.
6,014,080 A 1/2000 Layson, Jr.
6,084,510 A * 7/2000 Lemelson et al. ...... 340/539.13
6,166,679 A * 12/2000 Lemelson et al. ............. 342/45
6,172,640 B1 1/2001 Durst et al.
6,198,390 B1 3/2001 Schlager et al.
6,222,449 B1 * 4/2001 Twining ................ 340/539.11
6,243,039 B1 6/2001 Elliot
6,321,091 B1 11/2001 Holland
6,362,778 B2 3/2002 Neher
6,377,165 B1 4/2002 Yoshioka et al.
6,388,612 B1 5/2002 Neher
6,441,778 B1 8/2002 Durst et al.
6,484,035 B2 11/2002 Allen, Jr.
6,570,532 B2 5/2003 Mise et al.
6,614,394 B2 9/2003 Honda et al.
6,784,833 B1 8/2004 Evans
6,871,144 B1 * 3/2005 Lee ............................ 701/213
6,888,496 B1 5/2005 Cooper (Continued)

*Primary Examiner*—Donnie L Crosland
(74) *Attorney, Agent, or Firm*—Hahn Loeser & Parks, LLP

(57) ABSTRACT

A communications system for locating, tracking, and messaging between people, which preferably includes a satellite, global positioning satellites, ground monitoring units, and a portable-transmitter-receiver unit to locate and track objects and people. A communications satellite system can transmit and receive messages concerning the location and situation of an object or person. A location system may operate by way of global positioning satellites. The portable transmitter-receiver can activate a signal to the satellite system, which can inform the ground monitoring units that a person is in need of help. Each transmitter-receiver can contain memory that allows for identification of the wearer and can provide information such as address, medical problems, emergency contacts, etc.

35 Claims, 4 Drawing Sheets

U.S. PATENT DOCUMENTS

| | | | | |
|---|---|---|---|---|
| 2001/0026240 | A1* | 10/2001 | Neher | 342/357.07 |
| 2001/0030623 | A1 | 10/2001 | Shimada et al. | |
| 2002/0006800 | A1 | 1/2002 | Mohi | |
| 2002/0196800 | A1 | 12/2002 | Angermayr | |
| 2003/0195008 | A1 | 10/2003 | Mohi et al. | |
| 2004/0113836 | A1 | 6/2004 | Rickerson, Jr. | |
| 2005/0012663 | A1 | 1/2005 | Audren et al. | |
| 2005/0037773 | A1 | 2/2005 | Holland et al. | |
| 2005/0062644 | A1 | 3/2005 | Leci | |
| 2005/0212701 | A1 | 9/2005 | Nimmo | |

* cited by examiner

PERSONAL LOCATOR SYSTEM

This application claims priority from U.S. application Ser. No. 60/596,172, filed Sep. 6, 2005, hereby incorporated by reference.

BACKGROUND OF THE INVENTION

The invention relates generally to a communications system and more particularly to a satellite communications system comprised of an apparatus and method for messaging between receiver and transmitter units, locating, and tracking the position of a person in emergency and non-emergency situations.

Numerous tracking or personal locator systems have been provided in the prior art. While these units may be suitable for the particular purpose to which they address, they would not be as suitable for the purposes of the present invention as described here.

The prior art describes personal locator systems for determining the location of a locator unit. The prior art utilizes global positioning satellites to provide the position of the locator unit. Prior art systems may focus on location while the present invention describes a communications system to perform locating, tracking, and messaging between users. Prior art methods also can use cellular transmissions to transmit or receive signals from or to a tracking unit, while the system described in this invention can use a satellite system for these purposes.

The current methods of location are typically based upon a global positioning satellite system while this invention discloses a communications system that has the capability to transmit or receive information between a wearer of a portable transmitter/receiver unit and each transmitter and/or receiver unit in the system. The present invention provides an entire satellite communications network.

The foregoing illustrates limitations known to exist in present tracking or personal locator systems. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

The present invention comprises a communications system for messaging between a satellite system to locate and track a portable transmitter/receiver unit, "Goldfish." The method and apparatus consist of a satellite communications system to locate and track portable individual "Goldfish" units. The satellite signals are relayed to ground monitoring units for identification and location of the "Goldfish" unit.

The present invention provides a method of communication between people and authorities in emergency and non-emergency situations. A person can send out a signal in emergency or non-emergency situations to obtain their location, send messages, or provide visual communications. The authorities can send out a signal through the satellite communications system to identify, locate an individual transmitter/receiver unit, or notify a user of an emergency or non-emergency situation.

In one aspect of the present invention, this is accomplished by providing a personal locator system comprising: a portable transmitter-receiver having: means for determining a position of the portable transmitter-receiver; means for broadcasting the determined position; means for broadcasting a distress signal; and means for voice communication with a satellite communication system; and a ground monitoring unit having: means for data communication with the satellite communication system; means for voice communication with the satellite communication system; and means for displaying the portable transmitter-receiver determined position and distress signal.

In another aspect of the present invention, this is accomplished by providing a personal locator system comprising: a portable transmitter-receiver having: a position calculator; a satellite voice and data communicator operatively connected to the position calculator; and a display operatively connected to the position calculator and the satellite voice and data communicator; and a ground monitoring unit having: a satellite voice and data communicator operatively connected to the portable transmitter-receiver satellite voice and data communicator; and a display operatively connected to the satellite voice and data communicator.

In a further aspect of the present invention, this is accomplished by providing a method of locating a person comprising: locally receiving a trigger; operating, in response to the trigger, a GPS system determining the location of the person; transmitting to a remote location via a satellite the determined location of the person and a unique identifier; receiving at the remote location the transmitted determined location of the person and the unique identifier; displaying at the remote location the determined location of the person and information related to the unique identifier; verbally communicating with the person via the satellite.

The foregoing and other aspects will become apparent from the following detailed description of the invention when considered with the accompanying drawing figures.

BRIEF DESCRIPTION OF THE DRAWING FIGURES

DETAILED DESCRIPTION OF INVENTION

Figure 1:
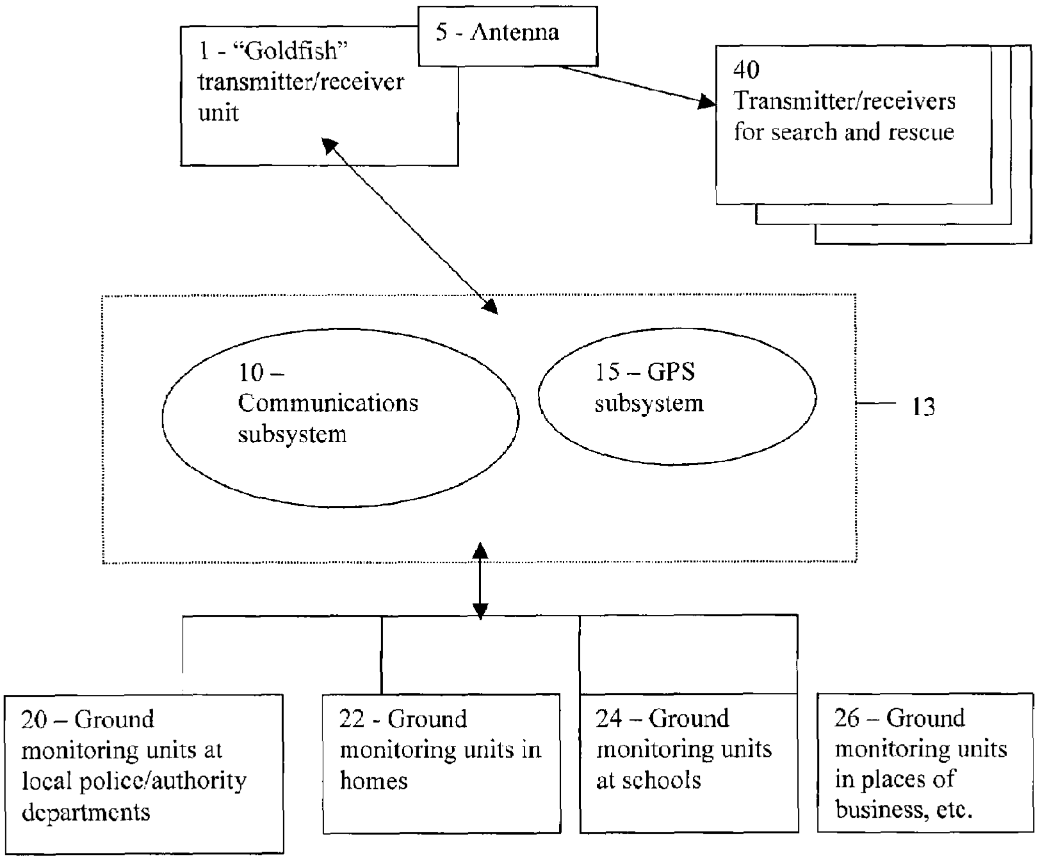
FIG. 1 is a diagram of the personal locator system of the present invention.

The "Goldfish" portable transmitter/receiver watch unit is a safety unit that allows a person to signal for help in all emergency and non-emergency situations. The "Goldfish" system can send out an emergency or non-emergency message preferably by way of satellite communications technology. The satellite communication system may connect people directly to the authorities, which provides a safety net in all situations. The "Goldfish" unit may provide a system for more effective search and rescue in emergency situations. The satellite system 13 can enable faster and more efficient communication when other systems of communication fail, such as, landline phone systems, cell phone systems, etc. The system preferably works in all situations including floods, mudflows, tsunamis, hurricanes, earthquakes, tornados, terrorist attacks, collapsed buildings, kidnappings, AMBER alert, hostage situations, forest fires, school shootings, etc. The "Goldfish" watch can act as a Homeland Security watch that can find a person in all of the above mentioned natural disasters, attacks, collapsed buildings, kidnappings, or any other situation where it is necessary to locate, track, and find a missing, lost, trapped, or injured person.

In case of an emergency, i.e., building collapse, terrorist attacks, kidnapping, hostage situation, or natural disaster, such as, tidal wave, mudflow, flood, earthquake, forest fire, tornado, etc., the "Goldfish" transmitter/receiver unit 1 sends a signal to a communications system preferably by way of the satellite system 13. The satellite system 13 may provide a superior way of calling authorities in emergency situations. The satellite system 13 can enhance all ground communication systems such as cell phone systems, landline phone systems, wireless networks, global positioning satellite GPS navigation systems, etc. A person in distress touches the "Goldfish" transmitter/receiver button and the system locates, tracks, and informs the authorities of the emergency situation and the location of the person in distress. The "Goldfish" unit 1 can have a locator and messaging system for children that can notify the police department first and then the parents or guardian as an added safety measure. This system can provide a secure means to keep track of small children through the elderly.

In one embodiment, the satellite system 13 can comprise a communications satellite subsystem 10 and a global positioning satellite subsystem 15. The satellite system 13 is designed to locate and track an object or person and may also provide information relating to the surrounding circumstances of a situation. The satellite system 13 may transfer signals to and from each unit in the system. Satellite systems 13 can be positioned around the globe to create an international satellite communications network, which provides a framework for several functions. The satellite system 13 can also include a central dispatch or contact center. The functions may include, but are not limited to, giving GPS coordinates of a person's location, sending digital messages, video and digital pictures, one way or two way audio communications, data transfer, emergency messages, providing authorities with pertinent information, weather alerts, security alerts, etc.

Satellite signals may be initiated from the portable "Goldfish" watch unit 1 or the ground monitoring units 20, 22, 24, 26. The signals may be emergency or non-emergency related. Upon receiving a request for information, the satellite system 13 can send the signal from a "Goldfish" unit 1 to the ground monitoring units 20, 22, 24, 26 to provide the location of the portable "Goldfish" unit 1. The message can be relayed back to the satellite system 13 and also back to the individual "Goldfish" unit 1. The "Goldfish" user can be notified of his or her location and which authorities or personnel have been contacted about the situation. The satellite system 13 can also utilize existing cellular, land line telephone, wireless internet, radio frequency, or any other communication technology as needed to send data. Data may be sent in the form of text, pictures, video, audio, etc.

Method of Communication FIG. 1

The "Goldfish" system can be activated when a person sends a signal from the "Goldfish" unit 1 to the satellite system 13 that help is needed. In one embodiment, the "Goldfish" unit 1 is in the form of a watch or bracelet that can be worn around the wrist or other part of the body as so desired. The "Goldfish" unit can also be attached to clothing, such as a belt, jacket, etc. The signal can be sent from the "Goldfish" watch 1 to the satellite system 13, which accepts the message and contacts the ground monitoring units 20, 22, 24, 26. The ground monitoring units 20, 22, 24, 26 can receive incoming/outgoing messages from the satellite system 13 about the location information from the individual "Goldfish" watch units 1 and can provide readouts of the message, preferably in the form of a text or picture message. The message can provide information concerning the location, situation, personal identification and circumstances surrounding the person wearing the portable "Goldfish" watch 1. The "Goldfish" watch 1 can access the global positioning satellites through the satellite system 13 to obtain the "Goldfish" watch's location. The "Goldfish" watch 1 can relay the signal to the satellite system 13 and the satellite system 13 can relay the signal to the ground monitoring units 20, 22, 24, 26. This information can be received by ground monitoring units 20, 22, 24, 26 in order to obtain help or other services. This informs the police department, local authorities, family, friends, etc., that a person is in need of help and what the situation entails.

Optionally, the "Goldfish" unit can function as a two-way audio communicator.

In another embodiment, a ground monitoring unit 20, 22, 24, 26 can force the "Goldfish" watch 1 to inform the ground monitoring units 20, 22, 24, 26 of a "Goldfish" watch's location. The ground monitoring units 20, 22, 24, 26 can send a signal to the satellite system 13. The satellite system can access the "Goldfish" watch 1 so that the "Goldfish" watch 1 can provide the satellite system 13 with the "Goldfish" wearer's location.

In a third embodiment, the local authorities can force the "Goldfish" watch 1 to inform the ground monitoring unit 20, 22, 24, 26 of the "Goldfish" watch's location. The ground monitoring units 20, 22, 24, 26 can send a signal to the satellite system 13. The satellite system 13 can access the "Goldfish" watch 1 so that the "Goldfish" watch 1 can provide the satellite system 13 with the "Goldfish" wearer's location.

In a fourth embodiment, the satellite system 13 can send a signal back to the "Goldfish" watch 1 in order to inform the person who sent the emergency/non-emergency signal that someone has been contacted. This notifies a "Goldfish" user that the signal was transmitted and received by the ground monitoring units.

In another embodiment, the satellite system 13 can send a signal to a group of "Goldfish" users in case of a large scale disaster. The signal is sent out to a large batch of "Goldfish" users at one time. The signal is designed to go out to all the "Goldfish" watches to inform the "Goldfish" users of a large scale disaster or emergency or local conditions such as weather, traffic, local dangers, etc. The satellite system 13 can locate and track anyone to whom the signal has been sent out to. The "Goldfish" user can send a signal back to the satellite system 13 which may allow the satellite system 13 to know if a person is alive and in need of help in all emergency or non-emergency situations.

The satellite communication system 13 can also notify schools of an emergency situation. The ground monitoring units 20, 22, 24, 26 can force the "Goldfish" watches 1 to broadcast a signal that there is an emergency situation in a school, or any other place.

Figure 2:
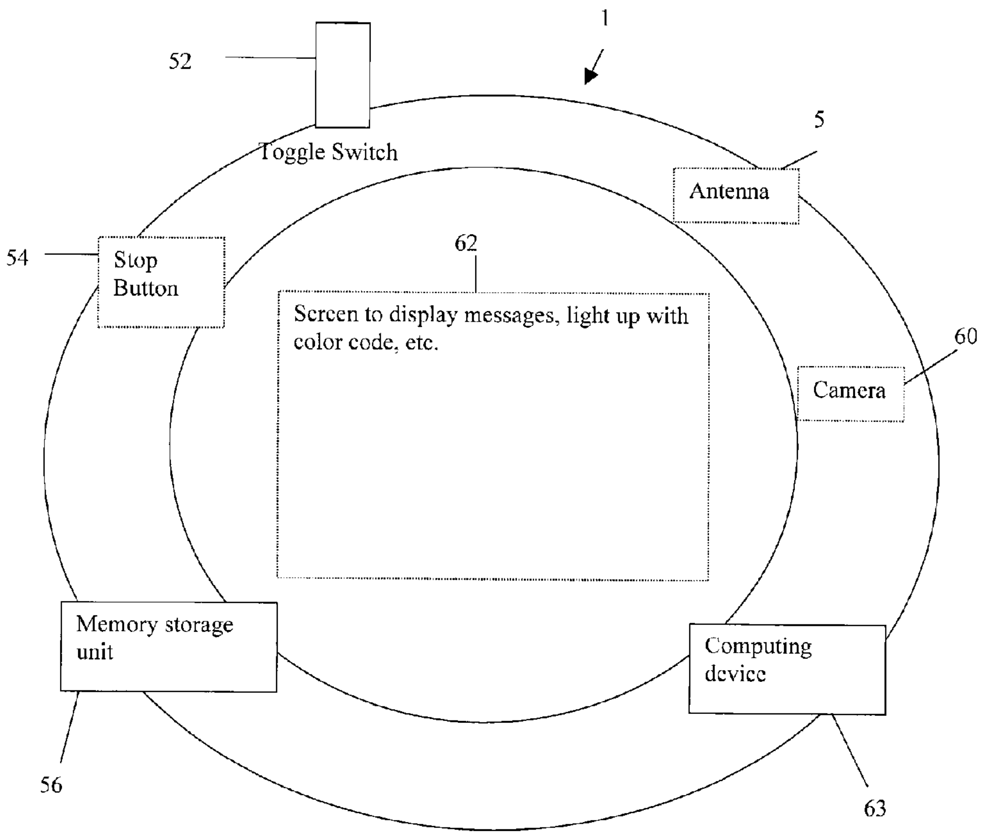
FIG. 2 is a drawing of the "Goldfish" portable transmitter/receiver watch unit shown in FIG. 1.

Individual Unit that Operates as a Location and Tracking Unit FIG. 2

In one embodiment, the "Goldfish" transmitter/receiver unit 1 is a portable individual watch that interacts with the satellite system 13 to relay information to ground monitoring units 20, 22, 24, 26. Preferably, the units turn on and off with a toggle switch 52. The toggle switch 52 may also determine the operating mode of the "Goldfish" watch 1. The modes include but are not limited to satellite messaging, search and rescue mode, normal operating mode, etc. The satellite messaging mode can send a distress signal to the satellite system 13, which can relay a signal to the ground monitoring units

20, 22, 24, 26. The normal operating mode could function as a watch, camera, navigation system, or other unit that is integrated with the "Goldfish" system. The "Goldfish" watch 1 can contain a stop button 54 to discontinue the selected operation or function.

The "Goldfish" watch 1 can have a memory unit 56 that stores personal identification information. The information stored in the memory 56 may include name, address, zip code, state, age, school district, place of employment, medical information, and any other important information needed in emergency situations. The information is preferably encrypted for safety, privacy, etc. The memory unit 56 is preferably embedded in the transmitter/receiver unit apart from the transmitter/receiver unit that interacts with the satellite system 13. This memory unit 56 can operate as storage for the data transferred between the satellite system 13, ground monitoring units 20, 22, 24, 26, and the "Goldfish" watch 1.

The individual "Goldfish" watch 1 may send text messages, pictures, video, audio messages, etc. The "Goldfish" watch 1 can contain a camera 60 to send pictures and/or videos of the situation and a screen 62 to display digital messages. The "Goldfish" watch may provide the daily time, a calendar, weather alerts, silent or audible signals, etc. The screen 62 may have a light source that may glow for use at all times of the day or night. Audio messaging may be used to send an alert signal that the wearer can hear. The wearer can also choose to have the signal sent silently or audibly. The silent signal will allow a "Goldfish" user to notify the authorities that help is needed if they are in a hostage situation or other situation where noise could cause the person's life to become endangered. Additionally, the "goldfish" unit may provide one or two way audio communications.

The "Goldfish" watch 1 can receive signals from the satellite system 13 to inform of severe weather conditions, warnings of disasters, or other important messages. The "Goldfish" watch 1 can be all-weatherproof and be able to withstand all temperature conditions. The "Goldfish" watch 1 can come in various models for adults, children of all ages, military personnel, etc.

GPS Location System

The operation of the global positioning and tracking system will now be described. In one embodiment, the "Goldfish" watch 1 should be secured to an object or person who is being monitored and the toggle switch 52 be in the correct operating mode. Once the "Goldfish" watch 1 is secured and turned on the system is be ready for operation.

When it is desired to locate and track an object or person to which the individual "Goldfish" watch 1 is secured, a person positions the toggle switch 52 to the correct operating mode. The satellite system 13 is in constant connection with the "Goldfish" watch 1 when the "Goldfish" watch 1 is turned on. The satellite system 13 sends out positioning signals and the "Goldfish" watch 1 receives the signals. The "Goldfish" watch 1 can send the signal to the satellite system 13, and the satellite system 13 can send the signal to the ground monitoring units 20, 22, 24, 26.

The portable transmitter-receiver 1 receives position information from the GPS subsystem 15. A computing device 63 in the transmitter-receiver 1 then determines the wearer' position based on the position information from the GPS subsystem 15.

Ground Monitoring Unit

The ground monitoring units 20, 22, 24, 26 can transmit and receive messages to or from the "Goldfish" watch 1, typically via the satellite system 13. The ground monitoring units 20, 22, 24, 26 can manage the messages from the satellite system sent from individual "Goldfish" watches 1 and can transmit messages to individual "Goldfish" watches 1 through the satellite system 13. The system can let the authorities know of emergency situations and notifies the wearer that others have information regarding the situation. The ground monitoring units 20, 22, 24, 26 can display a message informing authorities, emergency personnel, etc. of the circumstances surrounding the emergency or disaster conditions.

One of the ground monitoring units 20, 22, 24, 26 can function as a central station or central dispatch and communicate with other ground monitoring units.

The ground monitoring units 20, 22, 24, 26 can receive the messages from the satellite system 13. The ground monitoring units 20, 22, 24, 26 can detect the satellite signals and can provide a preferably digital readout of the "Goldfish" user's location and situation. The police can also use satellite digital phone, cell phone, and GPS navigation systems to access the satellite system 13 locally, nationally, or internationally. This satellite system 13 can provide the location of the person, name, and other important information in all emergency or non-emergency situations.

The ground monitoring units 20, 22, 24, 26 can accept incoming messages and relay outgoing messages from or to the satellite system 13. Depending upon whether the situation is emergency or non-emergency, a message is sent first to the police ground monitoring units 20. In an emergency, the police may be notified before the family, legal guardians, emergency contacts, etc. In a non-emergency, the signal can be first sent to the person's home, etc.

The local authorities can transmit a signal from the ground monitoring units 20, 22, 24, 26 to the satellite system 13 to communicate with the individual "Goldfish" watch 1. The satellite system 13 can directly set off or force the "Goldfish" watch 1 to obtain the location of a person wearing the personal "Goldfish" watch 1. The police departments can utilize the satellite system 13 to call the "Goldfish" watch 1 and locate a missing, trapped, or injured person.

Each "Goldfish" watch 1 may have a memory unit 56 that stores information regarding residence, medical information, and any other helpful information in an emergency situation. The satellite system 13 registers each user's personal code and stores the information in its secure network in the appropriate ground monitoring unit 20, 22, 24, 26 for easy identification of a "Goldfish" user.

In one embodiment, the personal locator system uses a portable transmitter-receiver 1 that communicates with the satellite communication system 13 which in turn communicates with a ground monitoring unit 20, 22, 24, 26. The portable transmitter-receiver 1 includes a computing device 63 that interacts with the satellite communication system 13 to determine the position of the user of the portable transmitter-receiver 1. The computing device 63 also functions to send or broadcast the determined position to at least the satellite communication system 13, and can also broadcast the determined position via antenna 5 to search and rescue transmitter-receivers 40. Other functions of the computing device include providing voice and data communication with at least the satellite communication system 13 and broadcasting, on demand, a distress signal. Additional, the computing device 63 can be initiated or triggered by a ground monitoring unit 20, 22, 24, 26 to determine the position of the user and broadcast the determined position back to the ground monitoring unit or to search and rescue transmitter-receivers 40.

Police Search and Rescue Units 40

In one embodiment, the police can use the communications system in search and rescue operations. The "Goldfish" watch 1 can have a transmitter preferably in the form of an antenna 5 that transmits a signal over ground communication technology such as wireless, cell phone, radio frequency, etc. The antenna 5 can transmit a signal that is capable of being received by local transmitter/receiver units 40.

Figure 4:
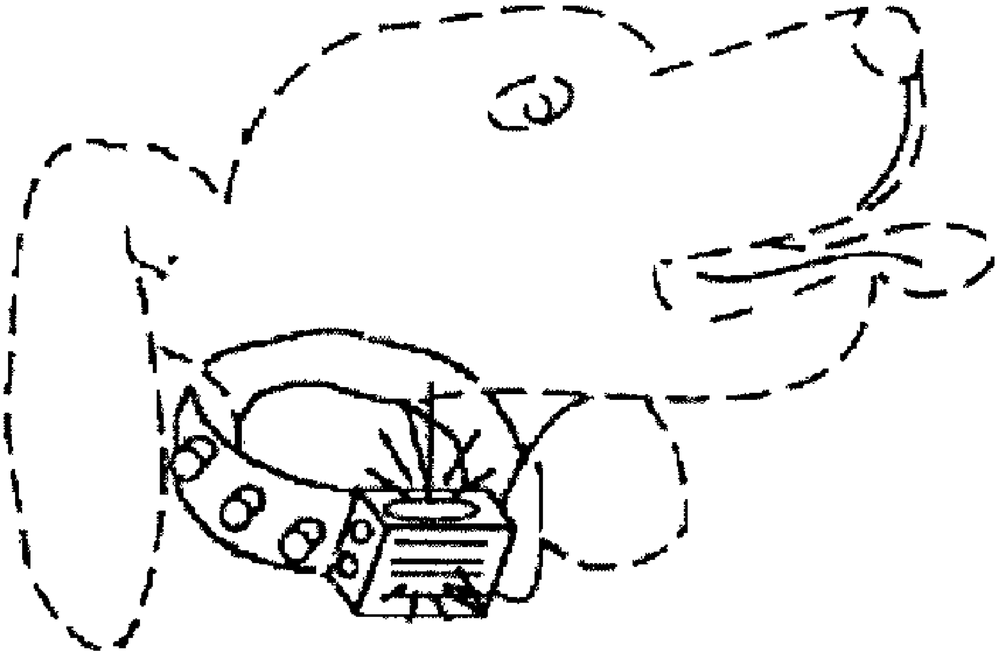
FIG. 4 is a schematic of a transmitter/receiver of the present invention for use by a search and rescue animal.

Rescue animals 80 wearing portable, local receiver/transmitter units 40, such as a collar 81 (see FIG. 4) or vest, and police with local receiver/transmitter units 40 can find people in emergency and disaster situations preferably through the signal broadcast by the antenna 5. The police and animal local transmitter/receiver units 40 can connect to other animal and police local receivers/transmitters 40 to exchange messages and updates about the situation. The local receivers/transmitters 40 may comprise rods, wands, portable devices, etc., which can move through the air to detect the signals from the other local receiver/transmitter units 40 or the individual "Goldfish" watches 1. The local receivers/transmitters 40 can detect the signal from the "Goldfish" watch unit's antenna 5 to determine the precise location of the "Goldfish" watch 1. The ground signals may be sent over cellular transmissions, wireless capabilities, radio frequency, or any other communications technology. The local receiver/transmitters 40 can light up to provide a visual signal of the tracking signal from the "Goldfish" watch 1.

In another embodiment, the local receiver/transmitter unit 40 can access the satellite system 13. The local receiver/transmitter unit 40 can send and/or receive a signal to the satellite system 13 and can obtain a GPS signal for tracking the local receiver/transmitter unit's 40 location. The local receiver/transmitter unit 40 can use its location signal and the location signal from the "Goldfish" watch 1 to determine the distance from the local receiver/transmitter unit 40 to the "Goldfish" watch 1. Once the local receiver/transmitter unit 40 has come within a close range of the "Goldfish" watch 1, the local receiver/transmitter unit 40 can use ground communication technology to ascertain a more precise location of the "Goldfish" watch 1 as described above. In this case, rescue animals or people who use the local transmitter/receiver units can receive a satellite signal from the satellite system 13 in order to locate the "Goldfish" user who is also receiving a satellite signal from the satellite system 13.

Operation of System in Emergency and Non-Emergency Modes

In an emergency situation, a user can initiate a signal to call for help by placing the "Goldfish" toggle switch 52 in the correct mode and pressing a "Goldfish" signaling button. The signal can be sent to the satellite system 13. The "Goldfish" unit 1 is in constant communication with the satellite system 13, which helps identify the location of the "Goldfish" user. The "Goldfish" unit 1 can send the location to the satellite system 13 and the satellite system 13 can send the signal to the ground monitoring units 20, 22, 24, 26. After each party has been contacted, the satellite system 13 will relay a message back to the "Goldfish" unit 1 that the proper people have been notified of the situation and location.

In an emergency situation, the authorities can send a signal to users regarding threatening conditions, other local conditions, or to locate a "Goldfish" user. If there is a high threat warning or dangerous weather conditions, the authorities can send a message by way of the ground monitoring units 20, 22, 24, 26. The ground monitoring units 20, 22, 24, 26 can send the message to the satellite system 13 and the satellite system 13 can send the message out to all users in the appropriate area. In this case, people can be alerted of an emergency situation beforehand. The authorities can also send a signal by way of the ground monitoring units 20, 22, 24, 26 to obtain the location of a "Goldfish" user. In the case of a missing, injured, trapped person, etc., the location of a "Goldfish" user can be ascertained by sending a message to the ground monitoring units 20, 22, 24, 26. The ground monitoring units 20, 22, 24, 26 can send a signal to the satellite system 13 to force the "Goldfish" unit 1 to turn on and receive incoming GPS signals. The "Goldfish" unit 1 can determine its location from the GPS subsystem 15. The "Goldfish" unit 1 can send the signal to the satellite system 13. The ground monitoring units 20, 22, 24, 26 can accept the signal from the satellite system 13, which can inform the authorities, families, friends, etc.

In a non-emergency situation, the authorities can locate a user or send warning messages when the situation is not an immediate emergency. The authorities send a signal by way of the ground monitoring units 20, 22, 24, 26. The ground monitoring units 20, 22, 24, 26 can specify the identification code of the user to whom the message should go. The ground monitoring units 20, 22, 24, 26 can send the signal to the satellite system 13. The satellite system 13 can access the "Goldfish" units 1, and therefore the "Goldfish" units 1 are now in contact with the satellite system 13. The satellite system 13 can provide the local, state, or national authorities with the GPS location and other data concerning the surroundings of the user. A message can also be sent to the satellite system 13 from the ground monitoring units 20, 22, 24, 26 and then relayed to the "Goldfish" user. The message can contain information about weather conditions or possible national security threats, etc.

In summary, "Goldfish" is primarily a system used to locate persons in distress, either actively, where the system actively transmits the location of the person to the authorities or passively by detecting the direction and/or distance from the rescuer to the distressed person.

In active mode, the "Goldfish" unit 1 communicates with the GPS subsystem 15 to determine the location of the user. The user's location is then transmitted via the satellite system 13 to the authorities 20, either at the request of the user or at the request of the authorities. Also, in active mode, the "Goldfish" unit 1 transmits locally via antenna 5 to search and rescue units 40. In active mode, a search and rescue unit 40 determines the location of the unit 40 via the GPS subsystem 15. Knowing the location of the search and rescue unit 40 and the location of the "Goldfish" unit 1, the unit 40 can determine the distance and direction to the user.

In passive mode, the search and rescue unit 40 determines the direction and distance through methods such as range finding, signal strength, triangulation, etc., using a local signal transmitted by antenna 5.

Figure 3:
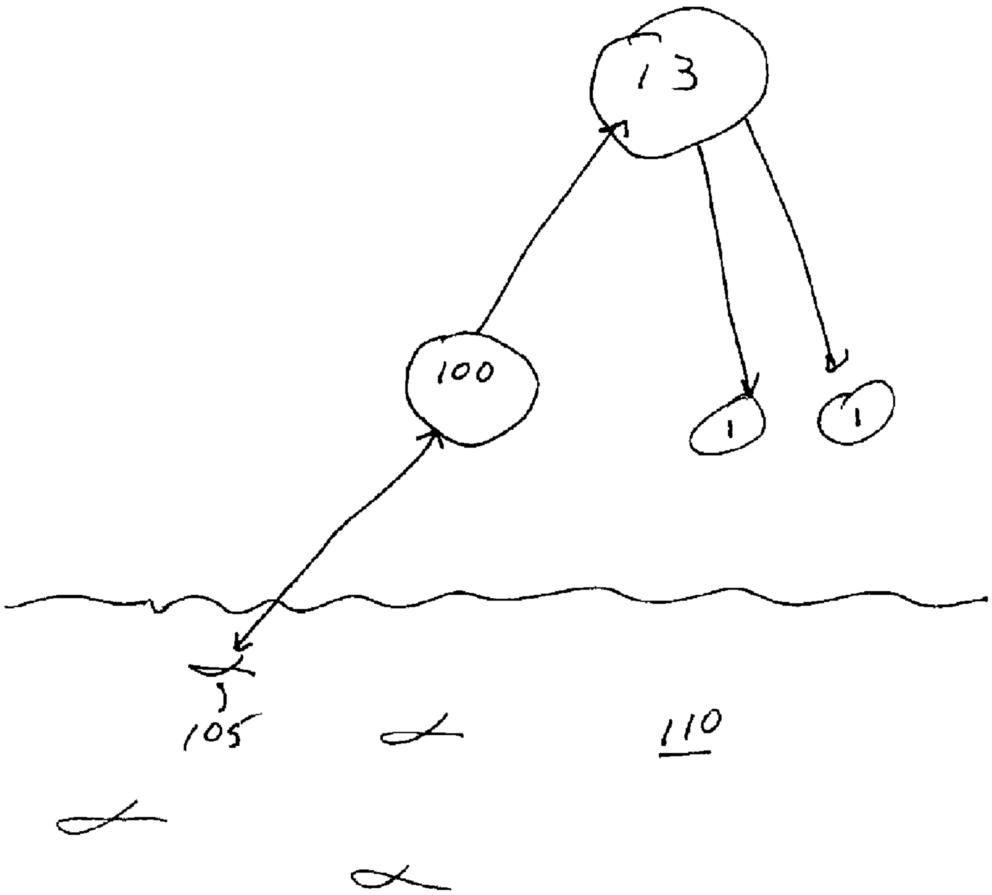
FIG. 3 is a schematic of a further embodiment of a combined "Goldfish" portable transmitter/receiver unit and fish finder.

An alternate embodiment of a combined "Goldfish" unit and fish finder 100 is shown in FIG. 3. The combined unit 100 is used near or on bodies of water, such as the ocean 110. The combined unit 100 uses readily available technology to detect fish 105, and in particular, dangerous fish, such as sharks, in the ocean 110. When dangerous fish 105 are detected, the combined unit 100 transmits a warning signal to the satellite system 13 which in turn transmits warning signals to any "Goldfish" units 1 within a predetermined distance of the combined unit 100 to warn others of the unseen danger in the ocean 110. The combined unit 100 functions similarly to the "Goldfish" unit 1 in that the combined unit 100 communicates with the satellite system 13 to determine its position, which is then used by the satellite system 13 to determine which "Goldfish" units 1 should receive the danger warning.

From the above description it can be seen that the satellite communications system of the present invention is able to overcome the shortcomings of prior art units by providing a communications network, which is able to communicate between individual “Goldfish” watch units 1, a satellite system 13, ground monitoring units 20, 22, 24, 26 and local receivers/transmitters 40 to locate, track, and message between individuals and objects anywhere around the world.

What is claimed is:

1. A personal locator system comprising:

a portable transmitter-receiver having:

a position calculator capable of determining a position of the portable transmitter-receiver;

a satellite voice and data communicator operatively connected to the position calculator;

a display operatively connected to the position calculator and the satellite voice and data communicator;

a memory unit operatively connected to the position calculator and the satellite voice and data communicator capable of storing encrypted personal identification information including one or more selected from the group consisting of name, address, zip code, state, age, school district, place of employment, and medical information; and a signaling button operatively connected to the memory unit, the position calculator, and the satellite voice and data communicator capable of initiating a silent signal comprising at least a portion of the encrypted personal identification information and the position of the portable transmitter-receiver; and a ground monitoring unit having:

a satellite voice and data communicator operatively connected to the portable transmitter-receiver satellite voice and data communicator capable of receiving the silent signal and processing the encrypted personal identification information and transmitting messages to the portable satellite voice and data communicator;

a display operatively connected to the satellite voice and data communicator and capable of displaying the personal identification information and the position of the portable transmitter-receiver; and a remote portable transmitter-receiver activator operatively connected to the ground monitoring unit satellite voice and data communicator capable of remotely initiating the portable transmitter-receiver broadcasting the silent signal comprising at least a portion of the encrypted personal identification information and the position of the portable transmitter-receiver in one of: a selected single portable transmitter-receiver, and a selected plurality of portable transmitter-receivers.

2. The personal locator system according to claim 1, wherein the position calculator comprises a GPS system.

3. The personal locator system according to claim 1, further comprising:

a search and rescue unit having:

a position calculator; and an antenna operatively connected to the search and rescue unit position calculator, the antenna receiving position information from the portable transmitter-receiver.

4. The personal locator system according to claim 3, wherein the search and rescue unit includes a satellite communicator operatively connected to the search and rescue unit position calculator.

5. The personal locator system according to claim 3, wherein the search and rescue unit comprises an animal collar.

6. The personal locator system according to claim 1, wherein the portable transmitter-receiver further comprises a wrist band.

7. The personal locator system according to claim 1, wherein the portable transmitter-receiver further comprises a wrist watch.

8. The personal locator system according to claim 1, wherein the portable transmitter-receiver is all-weatherproof and includes a fish finder capable of locating dangerous fish proximate to the portable transmitter-receiver and transmitting a warning signal to the ground monitoring unit; and wherein the ground monitoring unit satellite voice and data communicator is capable of broadcasting fish related information to other portable transmitter-receivers proximate the portable transmitter-receiver transmitting the warning signal.

9. The personal locator system according to claim 1, wherein the portable transmitter-receiver display includes both visual and audio displays.

10. The personal locator system according to claim 1, wherein the portable transmitter-receiver includes a camera.

11. The personal locator system according to claim 1, where the ground monitoring unit satellite voice and data communicator is capable of broadcasting information to a selected plurality of portable transmitter-receivers, the information relating to at least one of: weather information, emergency information, and hazard information.

12. The personal locator system according to claim 11, where the portable transmitter-receiver display is capable of displaying information comprising at least one of: status information, weather information, audio information, and video information.

13. The personal locator system according to claim 1, where the portable transmitter-receiver is capable of receiving a signal notifying that the ground monitoring unit received the silent signal and providing a visual indicator to a user.

14. The personal locator system according to claim 8, where the portable transmitter-receiver is capable of receiving fish related information when the portable transmitter-receiver is within a predetermined distance of the located fish.

15. A method of locating a person comprising:

providing a portable transmitter-receiver having:

a position calculator comprising a GPS system capable of determining a position of the portable transmitter-receiver;

a satellite voice and data communicator operatively connected to the position calculator;

a display operatively connected to the position calculator and the satelite voice and data communicator;

a memory unit operatively connected to the position calculator and the satellite voice and data communicator capable of storing encrypted personal identification information including one or more selected from the group consisting of name, address, zip code, state, age, school district, place of employment, and medical information; and a signaling button operatively connected to the memory unit, the position calculator, and the satellite voice and data communicator capable of generating a trigger to initiate a silent signal comprising at least a portion of the encrypted personal identification information and the position of the portable transmitter-receiver; and providing a ground monitoring unit having:

a satellite voice and data communicator operatively connected to the portable transmitter-receiver satellite voice and data communicator capable of receiving the silent signal and processing the encrypted personal identification information and transmitting messages to the portable satellite voice and data communicator;

a display operatively connected to the satellite voice and data communicator and capable of displaying the personal identification information and the position of the portable transmitter-receiver; and a remote portable transmitter-receiver activator operatively connected to the ground monitoring unit satellite voice and data communicator capable of remotely generating the trigger to initiate the portable transmitter-receiver broadcasting the silent signal comprising at least a portion of the encrypted personal identification information and the position of the portable transmitter-receiver in one of: a selected single portable transmitter-receiver, and a selected plurality of portable transmitter-receivers;

locally receiving the trigger by the portable transmitter-receiver; operating, in response to the trigger, the GPS system determining the location of the person;

transmitting the silent signal by the portable transmitter-receiver to the ground monitoring unit at a remote location via a satellite including the determined location of the person, a unique identifier, and at least a portion of the encrypted personal identification information;

receiving by the ground monitoring unit at the remote location the transmitted determined location of the person, the unique identifier, and the encrypted personal identification information;

displaying at the remote location the determined location of the person, information related to the unique identifier, and the personal identification information; and verbally communicating with the person via the satellite.

16. The method of locating a person according to claim 15, further comprising:

at the remote location generating the trigger.

17. The method of locating a person according to claim 15, further comprising:

locally generating the trigger.

18. The method of locating a person according to claim 15, further comprising:

the person being located transmitting visual information via the satellite.

19. The method of locating a person according to claim 15, further comprising:

the person transmitting via the satellite a distress silent signal to the remote location.

20. The method of locating a person according to claim 15, further comprising:

receiving at a search and rescue location a person position indicating signal from the person being located;

determining from the person position indicating signal the location of the person relative to the search and rescue location.

21. The method of locating a person according to claim 20, further comprising:

locally transmitting the person position indicating signal to the search and rescue location.

22. The method of locating a person according to claim 20, further comprising:

operating a GPS system determining the position of the search and rescue location;

transmitting to the search and rescue location the determined location of the person.

23. The method of locating a person according to claim 22, further comprising:

at the search and rescue location generating the trigger.

24. The method of locating a person according to claim 22, wherein the step of transmitting to the search and rescue location the determined location of the person comprises transmitting the determined location of the person from the remote location.

25. The method of locating a person according to claim 15, further comprising:

broadcasting information from the remote location to the person.

26. The method of locating a person according to claim 25, wherein the step of broadcasting information comprises:

transmitting the trigger from the remote location to a plurality of persons;

receiving at the remote location a plurality of transmitted determined locations of the persons;

selecting a subset of persons based on the transmitted determined locations;

broadcasting information to the selected subset of persons.

27. The method of locating a person according to claim 15, further comprising the step of:

transmitting by the ground monitoring unit to the portable transmitter-receiver a signal notifying that the ground monitoring unit received the silent signal.

28. A personal locator system comprising:

a portable transmitter-receiver having:

a position calculator capable of determining a position of the portable transmitter-receiver;

a satellite voice and data communicator operatively connected to the position calculator; and a display operatively connected to the position calculator and the satellite voice and data communicator; and a fish finder capable of locating dangerous fish proximate to the portable transmitter-receiver and transmitting a warning signal; and a ground monitoring unit having:

a satellite voice and data communicator operatively connected to the portable transmitter-receiver satellite voice and data communicator, the satellite voice and data communicator capable of receiving the warning signal and broadcasting fish related information to other portable transmitter-receivers proximate the portable transmitter-receiver transmitting the warning signal; and a display operatively connected to the satellite voice and data communicator; and a remote portable transmitter-receiver activator operatively connected to the ground monitoring unit satellite voice and data communicator capable of remotely initiating the portable transmitter-receiver position calculator, determining a position of the portable transmitter-receiver and broadcasting the position of the portable transmitter-receiver in one of: a selected single portable transmitter-receiver, and a selected plurality of portable transmitter-receivers.

29. The personal locator system according to claim 28, where the position calculator comprises a GPS system.

30. The personal locator system according to claim 28, where the dangerous fish are sharks.

31. The personal locator system according to claim 28, where the portable transmitter-receiver display includes both visual and audio displays.

32. The personal locator system according to claim 28, where the portable transmitter-receiver includes a camera.

33. The personal locator system according to claim 28, where the ground monitoring unit satellite voice and data communicator is capable of broadcasting information to a selected plurality of portable transmitter-receivers, the information relating to at least one of: weather information, emergency information, and hazard information.

34. The personal locator system according to claim 28, where the portable transmitter-receiver display is capable of displaying information comprising at least one of: status information, weather information, audio information, and video information.

35. The personal locator system according to claim 28, where the portable transmitter-receiver is capable of receiving fish related information when the portable transmitter-receiver is within a predetermined distance of the located fish.

* * * * *